United States Patent
Tian

(10) Patent No.: US 10,530,834 B2
(45) Date of Patent: Jan. 7, 2020

(54) RESENDING A HYPERTEXT TRANSFER PROTOCOL REQUEST

(71) Applicant: Alibaba Group Holding Limited, George Town (KY)

(72) Inventor: Liang Tian, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 39 days.

(21) Appl. No.: 15/842,486

(22) Filed: Dec. 14, 2017

(65) Prior Publication Data

US 2018/0109588 A1 Apr. 19, 2018

Related U.S. Application Data

(63) Continuation of application No. PCT/CN2016/085215, filed on Jun. 8, 2016.

(30) Foreign Application Priority Data

Jun. 16, 2015 (CN) .......................... 2015 1 0335208

(51) Int. Cl.
*G06F 15/16* (2006.01)
*H04L 29/08* (2006.01)
(Continued)

(52) U.S. Cl.
CPC ............ *H04L 67/02* (2013.01); *G06F 16/955* (2019.01); *H04L 29/06* (2013.01); *H04L 41/00* (2013.01);
(Continued)

(58) Field of Classification Search
CPC ... H04L 29/08072; H04L 29/06; H04L 67/02; H04L 67/10; H04L 69/28
(Continued)

(56) References Cited

U.S. PATENT DOCUMENTS 7,185,364 B2 * 2/2007 Knouse ............... H04L 63/0815
726/8
7,373,376 B1 * 5/2008 Hamer ................. H04L 43/10
709/203
(Continued)

FOREIGN PATENT DOCUMENTS

CN 101075908 11/2007
CN 101079768 11/2007
(Continued)

OTHER PUBLICATIONS

International Search Report issued by the International searching Authority in International Application No. PCT/CN2016/085215 dated Aug. 11, 2016; 8 pages.
(Continued)

*Primary Examiner* — Khanh Q Dinh
(74) *Attorney, Agent, or Firm* — Fish & Richardson P.C.

(57) ABSTRACT

Technologies related to resending hypertext transfer protocol (HTTP) requests are disclosed. One or more operations performed on a first web page is monitored. One or more HTTP requests that include the monitored one or more operations are sent to a server. Information associated with the one or more HTTP requests are recorded. Upon determining that an HTTP request of the one or more HTTP requests has failed to be sent, the HTTP request is recorded to a list of HTTP requests that failed to be sent. The HTTP request recorded to the list is deleted after receiving a normal response message from the server, and whether the list of HTTP requests that failed to be sent is empty is determined when redirecting from the first web page to a second web page.

20 Claims, 3 Drawing Sheets

(51) Int. Cl.
*G06F 16/955* (2019.01)
*H04L 12/24* (2006.01)
*H04L 29/06* (2006.01)
*H04L 29/12* (2006.01)

(52) U.S. Cl.
CPC ........ *H04L 41/069* (2013.01); *H04L 61/6009* (2013.01); *H04L 67/2814* (2013.01); *H04L 69/329* (2013.01)

(58) Field of Classification Search
USPC .......................................................... 709/224
See application file for complete search history.

(56) References Cited

U.S. PATENT DOCUMENTS

| | | | |
|---|---|---|---|
| 7,392,321 B1* | 6/2008 | Wolf | H04L 41/5009 709/203 |
| 7,458,096 B2* | 11/2008 | Knouse | H04L 63/0815 726/8 |
| 8,448,233 B2* | 5/2013 | Shulman | H04L 63/1425 713/176 |
| 8,856,869 B1* | 10/2014 | Brinskelle | G06F 21/6218 726/2 |
| 8,868,707 B2* | 10/2014 | Mehta | H04L 67/2842 709/223 |
| 8,935,418 B2* | 1/2015 | Knouse | H04L 63/0815 709/229 |
| 9,319,469 B2* | 4/2016 | Ruhlen | H04L 67/16 |
| 9,853,963 B2* | 12/2017 | Hirata | H04L 63/083 |
| 9,882,956 B1* | 1/2018 | Roth | H04L 67/02 |
| 9,954,860 B2* | 4/2018 | Wood | G06Q 20/4014 |
| 2002/0062369 A1 | 5/2002 | Klopp et al. | |
| 2002/0091745 A1* | 7/2002 | Ramamurthy | G06F 21/62 718/100 |
| 2005/0216421 A1* | 9/2005 | Barry | G06F 11/0709 705/64 |
| 2008/0209030 A1 | 8/2008 | Goldszmidt et al. | |
| 2009/0106433 A1* | 4/2009 | Knouse | H04L 63/0815 709/229 |
| 2016/0371099 A1* | 12/2016 | Woog | G06F 9/44505 |
| 2018/0205706 A1* | 7/2018 | Broadbent | H04L 63/0281 |

FOREIGN PATENT DOCUMENTS

| | | |
|---|---|---|
| CN | 101388768 | 3/2009 |
| CN | 101689194 | 3/2010 |
| CN | 102355449 | 2/2012 |
| EP | 2788900 | 10/2014 |
| WO | WO 2008112877 | 9/2008 |

OTHER PUBLICATIONS

PCT International Preliminary Report on Patentability in International Application No. PCT/CN2016/085215, dated Dec. 19, 2017, 11 pages (with English translation).
PCT Written Opinion of the International Searching Authority in International Application No. PCT/CN2016/085215, dated Aug. 11, 2016, 7 pages (with English translation).
European Extended Search Report in European Application No. 16810947.8, dated Nov. 7, 2018, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

RESENDING A HYPERTEXT TRANSFER PROTOCOL REQUEST

This application is a continuation of PCT Application No. PCT/CN2016/085215, filed on Jun. 8, 2016, which claims priority to Chinese Patent Application No. 201510335208.3, filed on Jun. 16, 2015, and each application is incorporated by reference in its entirety.

TECHNICAL FIELD

This disclosure relates to data transmission and, more particularly, to data transmission related to hypertext transfer protocol.

BACKGROUND

Hypertext transfer protocol (HTTP) is an application-layer protocol in a Transmission Control Protocol/Internet Protocol (TCP/IP) model. When a client computing device and a server need to communicate with each other, a TCP connection is established first between the client computing device and the server, and the client-device sends HTTP requests (for example, using a browser-type program) to the server.

HTTP requests can be used to send monitoring data recorded by the client computing device to the server. When a user of and client computing device performs an operation on a web page in a browser (for example, clicking a link on the web page or logging in to an account), the client computing device can monitor the operation and send the monitoring data to a server using an HTTP request.

After receiving the HTTP request, the server can return a response to the client computing device. A normal response can indicate that the HTTP request is successfully sent. An abnormal/unexpected response or lack of a response can indicate that the HTTP request failed to be sent and the server does not receive the data. For example, when a web page redirects, that is, a first web page is redirected to a second web page, the client computing device can offload the content of the first web page and load the content of the second web page. During the offloading process, the HTTP request may fail to be sent or cancelled by the browser. In such case, the server may not receive the monitoring data, which can result in data loss.

SUMMARY

The present disclosure describes methods and systems, including computer-implemented methods, computer program products, and computer systems for resending Hypertext transfer protocol (HTTP) requests.

In an implementation, one or more operations performed on a first web page is monitored. One or more HTTP requests that include the monitored one or more operations are sent to a server. Information associated with the one or more HTTP requests are recorded. Upon determining that an HTTP request of the one or more HTTP requests has failed to be sent, the HTTP request is recorded to a list of HTTP requests that failed to be sent. The HTTP request recorded to the list is deleted after receiving a normal response message from the server, and whether the list of HTTP requests that failed to be sent is empty is determined when redirecting from the first web page to a second web page.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to enable resending of failed HTTP requests and to avoid data loss. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
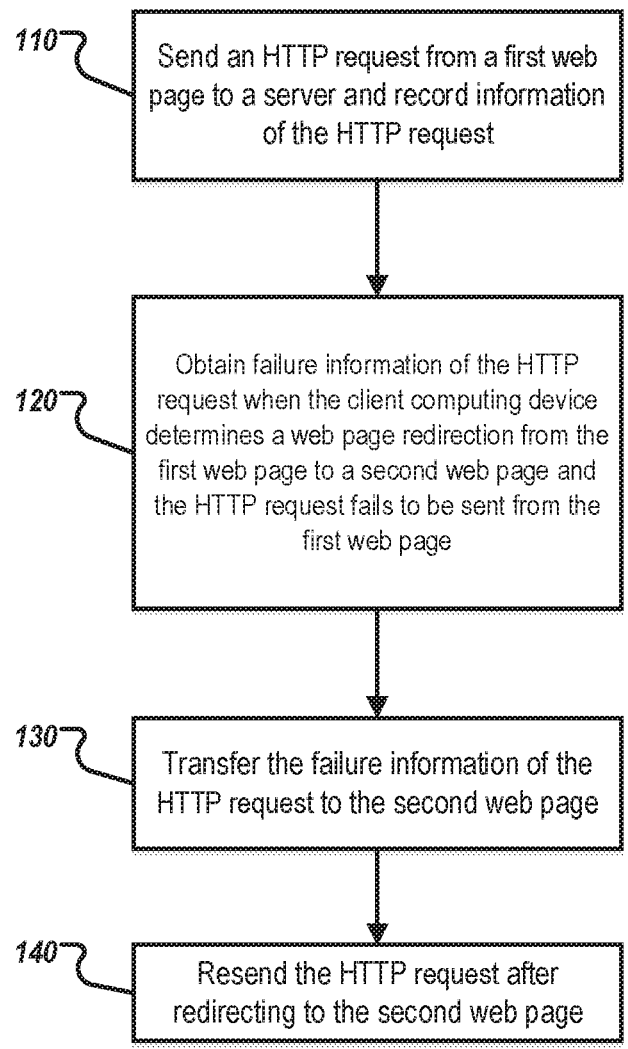
FIG. 1 is a flowchart illustrating an example Hypertext Transfer Protocol request resending method, according to an implementation of the present disclosure.

The following detailed description describes hypertext transfer protocol request resending methods, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Hypertext transfer protocol (HTTP) is an application-layer protocol in a Transmission Control Protocol/Internet Protocol (TCP/IP) model. When a client computing device (for example, a smart phone, tablet-type computer, or laptop computer) and a server need to communicate with each other, a TCP connection is established first between the client computing device and the server, and the client-device sends HTTP requests (for example, using a browser-type program) to the server.

HTTP requests can be used to send monitoring data recorded by the client computing device to the server. When a user of and client computing device performs an operation on a web page in a browser (for example, clicking a link on the web page or logging in to an account), the client computing device can monitor the operation and send the monitoring data to a server using an HTTP request.

After receiving the HTTP request, the server can return a response to the client computing device. A normal response can indicate that the HTTP request is successfully sent. An abnormal/unexpected response or lack of a response can indicate that the HTTP request failed to be sent and the server does not receive the data. For example, when a web page redirects, that is, a first web page is redirected to a second web page, the client computing device can offload the content of the first web page and load the content of the second web page. During the offloading process, the HTTP request may fail to be sent or cancelled by the browser. In such case, the server may not receive the monitoring data, which can result in data loss.

The present disclosure describes methods related to resending HTTP requests. The HTTP requests that fail to be sent before web page redirection can be recorded and transferred to the redirected web page. The HTTP requests can then be resent based on the recorded information to avoid data loss. In some implementations, the described methodology can be used by a client computing device sending HTTP requests to a server or a server sending HTTP requests to a client computing device.

FIG. 1 is a flowchart illustrating an example HTTP request resending method 100, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a client computing device sends an HTTP request from a first web page to a server and records information of the HTTP request. Data communication under the HTTP protocol can start with a request sent from a client computing device and ends with a response received from a server. For example, when a website uniform resource locator (URL) beginning with the text with "http://" is entered into a web browser from a client computing device, a request can be sent to a web server that hosts a website associated with the complete URL (for example, ALIPAY). The web server, in turn, returns a response as a hypertext markup language (HTML) page or any other document format to display in the web browser. An example HTTP request sent by a client computing device can include a request line to get a required resource, one or more headers, an empty line, and a message body. An example response sent from a server can include an HTTP Status Code, one or more headers, an empty line, and a message body. When an HTTP request is sent, HTTP request information can be recorded by the client computing device. From 110, method 100 proceeds to 120.

At 120, the client computing device obtains failure information associated with the HTTP request when the client computing device determines that a web page redirection from the first web page to a second web page occurred and that the HTTP request failed to be sent from the first web page. When redirecting from a first web page to a second web page, the client computing device can determine whether there is an HTTP request that failed to be sent from the first web page. If yes, the client computing device can acquire information of the HTTP request that failed to be sent and transfer the information to the second web page. As such, after redirecting to the second web page, the client computing device can resend the HTTP request based on the transferred information to avoid data loss. From 120, method 100 proceeds to 130.

At 130, the client computing device transfers the failure information of the HTTP request to the second web page. From 130, method 100 proceeds to 140.

At 140, the client computing device resends the HTTP request after redirecting to the second web page. After 140, method 100 ends.

Figure 2:
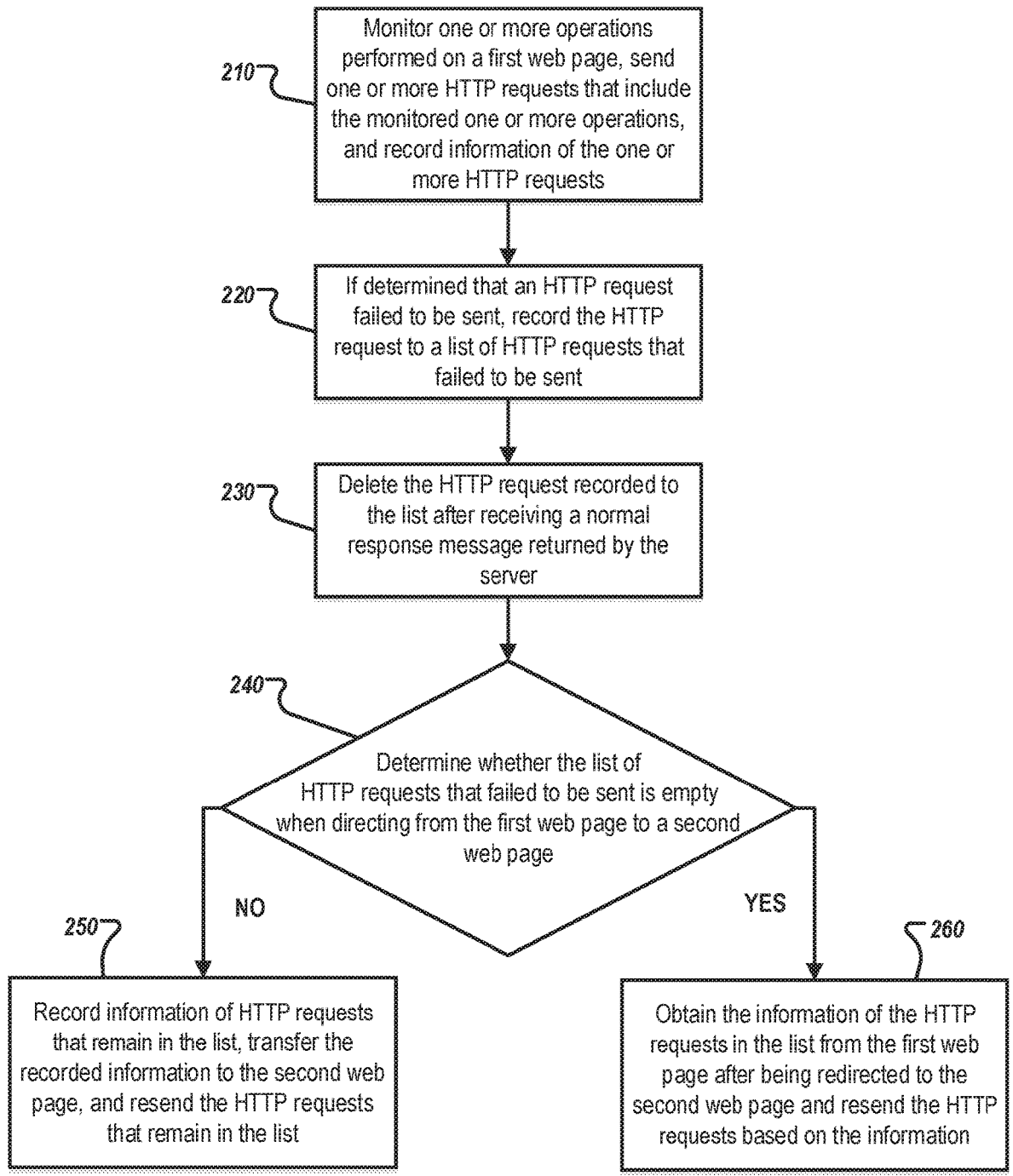
FIG. 2 is a flowchart illustrating another example Hypertext Transfer Protocol request resending method, according to an implementation of the present disclosure.

FIG. 2 is a flowchart illustrating another example HTTP request resending method 200, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 210, a client computing device monitors one or more operations performed on a first web page, sends one or more HTTP requests that include the monitored one or more operations, and records information of the one or more HTTP requests. In some cases, the first web page can be a web page currently opened in a browser on the client computing device. When an operation is performed on the first web page (such as, clicking a link or logging in to a user account), the client computing device can monitor the operation and send the monitoring data to the server as an HTTP request.

In some cases, the client computing device can record information associated with the HTTP request, including a request method, a URL, and the HTTP protocol version when the HTTP request is sent. As such, after determining that the HTTP request failed to be sent, the client computing device can resend the HTTP request according to the recorded complete information of the HTTP request, thereby avoiding data loss on the server. From 210, method 200 proceeds to 220.

At 220, if it is determined that an HTTP request failed to be sent to the server, the client computing device records the HTTP request to a list (that is, HTTP requests that failed to be sent). In some cases, the client computing device can store a list of HTTP requests that failed to be sent. From 220, method 200 proceeds to 230.

At 230, the client computing device deletes the HTTP request recorded to the list after receiving a normal response message returned by the server. If an abnormal response message is returned by the server or no response message is received, the HTTP request recorded to the list of requests stays.

In some cases, the response message from the server can be a status code. For example, a normal response message can have a status code "200," indicating that the HTTP request was sent successfully. If the status code of the response message is not "200," the response message can be considered to be an abnormal response message, indicating that the HTTP request failed to be sent. The scenario where no response message is received can also indicate that the HTTP request failed to be sent. This scenario may be caused by web page redirection that occurs before a sending process of the HTTP request is complete, the client computing device may cancel the HTTP request under such case. In this case, a timeout value can be used to make the determination that a message has not been received after waiting for a response message for the timeout value length of time.

In some cases, to ensure data integrity of the server, data associated with the HTTP request is resent if it is determined that the HTTP request failed to be sent. Therefore, information related to the HTTP request is maintained in the recorded list of HTTP requests that failed to be sent, such that it can be used by a second web page the first web page is redirected to. The client computing device can resend the HTTP request after being redirected to the second web page based on the information maintained in the list. From 230, method 200 proceeds to 240.

At 240, the client computing device determines whether the list of HTTP requests that failed to be sent is empty when redirecting from the first web page to a second web page. If YES, method 200 proceeds to 260. Otherwise, method 200 proceeds to 250.

At 250, the client computing device records information of HTTP requests that remain in the list, transfers the recorded information to the second web page, and resends the HTTP requests that remain in the list to the server. In some cases, when web page redirection occurs such as from a first web page to a second web page, the client computing device can offload the content of the first web page and load the content of the second web page. During the offloading process, if an HTTP request fails to send or is incompletely sent when the client computing device is on the first web page state, the HTTP request may be cancelled, and the server cannot receive monitoring data included in the HTTP request.

In some cases, the client computing device can check whether the list of HTTP requests that failed to be sent is empty when a web page redirection occurs. An empty list can indicate that all the HTTP requests from the first web page are successfully sent, no data need to be resent, and the web page redirection can be performed without transferring failure information from the first web page to the second web page. If the list is not empty, it can indicate that the HTTP requests included in the list failed to be sent or may not have been completely sent from the first web page. To prevent data loss, the client computing device can transfer information of the HTTP requests included in the list to the second web page, such that the client computing device can resend the HTTP requests based on the information of the HTTP requests after redirecting to the second web page. In some cases, the list of HTTP requests that failed to be sent can be configured to include as much information as it is possible to obtain for the HTTP requests that failed to be sent to ensure the resending can be successfully performed. For example, the complete data associated with a request can be stored in the list as opposed to selected portions.

In some cases, recording information of HTTP requests to the list and transferring the information to the second web page can include: 1) recording information of the HTTP requests that failed to be sent to the list and 2) writing the information to a window name of the second web page. If the redirection from the first web page to the second web page is in a same window (for example, the second web page is opened by clicking "opening link in new tab" or performing a login operation to an account that redirects the web page from a login page to an account summary page), the window name of the second web page can be the same as the window name of first web page. In such cases, the information of the HTTP requests in the list of requests that failed to be sent can be written in the name of the currently opened window.

In some cases, the redirection from the first web page to the second web page is a redirection to a different window (for example, the second web page is opened by clicking "open link in new window"), the window name corresponding to the second web page can be different from the window name of the first web page. In such cases, the client computing device can obtain the window name of the second web page based on redirection instructions, and can write the information of the HTTP requests in the name of the window that is redirected to.

At 260, the client computing device obtains the information of the HTTP requests in the list from the first web page after being redirected to the second web page and resends the HTTP requests based on the obtained information.

In some cases, the information of the HTTP requests in the list of requests that fail to be sent from the first web page are written in the window name of the second web page. The client computing device can obtain the information of the HTTP requests from the window name of the second web page. The client computing device can then resend the HTTP requests that failed to be sent from the first web page based on the information.

In some cases, an HTTP request can be recorded in an HTTP request cache pool. If a normal response message is returned by the server, the client computing device can delete the corresponding HTTP request from the HTTP request cache pool. If the client computing device receives an abnormal response message returned by the server or does not receive a response, the corresponding HTTP remains in the HTTP request cache pool. In some cases, the client computing device can check whether the cache pool of HTTP requests that fail to be sent is empty when a web page redirection occurs. An empty cache pool can indicate that all the HTTP requests from the first web page are successfully sent, no data need to be resent, and the web page redirection can be performed without transferring failure information from the first web page to the second web page. If the cache pool is not empty, it can indicate that the HTTP requests included in the cache pool fail to be sent or may not be completely sent from the first web page. The client computing device can then resend the HTTP requests based on the information of the HTTP requests transferred to the second web page.

In some cases, the HTTP request can be recorded to a list of HTTP requests, and the state of the HTTP request can be marked as having failed to be sent. If a normal response message is returned by the server, the client computing device can modify the state of the HTTP request in the list to successfully send. If the client computing device receives an abnormal response message returned by the server or does not receive a response, the status of the corresponding HTTP request in the list is unchanged. When a web page redirection occurs, the client computing device can determine whether an HTTP request failed to be sent based on whether it is marked. If the HTTP request's state is marked as having failed to be sent, the client computing device can transfer the information of the corresponding HTTP request to the second web page. The client computing device can then resend the HTTP request based on the information of the HTTP request transferred to the second web page.

In some cases, updating the list of HTTP request each time a normal response message is returned can be burdensome to the client computing device. The client computing device can update the list when certain event such as a web page redirection occurs. For example, when a web page redirection is detected, the client computing device can determine which HTTP requests can be deleted from the list based on whether corresponding normal responses are returned by the server. The list can be updated by deleting HTTP requests with normal responses received from the server.

Figure 3:
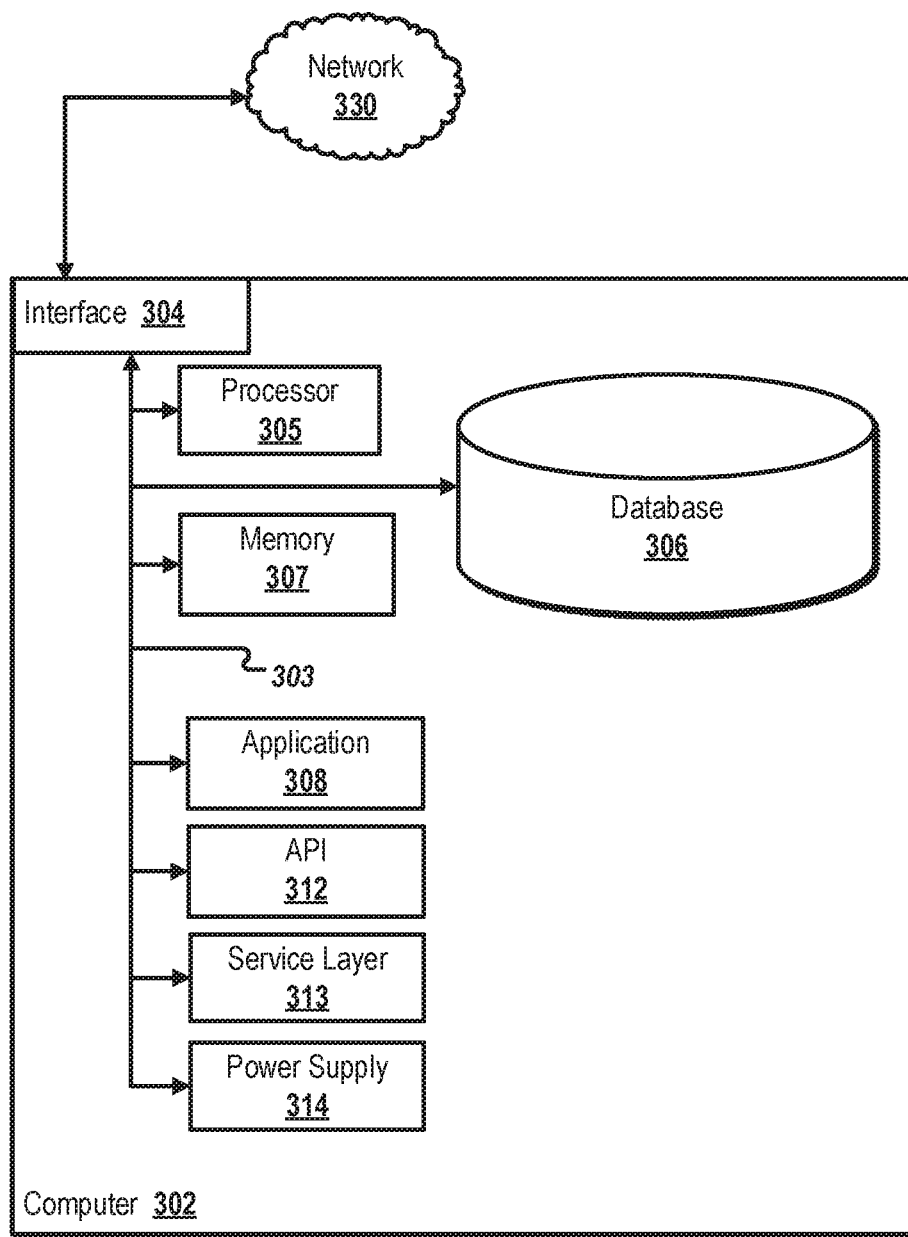
FIG. 3 is a block diagram illustrating an example of a computer system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing the subject matter described in the present disclosure. The illustrated Computer 302 is communicably coupled with a Network 330. In some implementations, one or more components of the Computer 302 can be configured to operate within an environment, including cloud-computing-based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, e-mail server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, conventional, or another type of database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: monitoring one or more operations performed on a first web page; sending one or more HTTP requests that include the monitored one or more operations to a server; recording information associated with the one or more HTTP requests; upon determining that an HTTP request of the one or more HTTP requests has failed to be sent, recording the HTTP request to a list of HTTP requests that failed to be sent; deleting the HTTP request recorded to the list after receiving a normal response message from the server; and determining whether the list of HTTP requests that failed to be sent is empty when redirecting from the first web page to a second web page.

The foregoing and other described implementations can each, optionally, include one or more of the following features:

A first feature, combinable with any of the following features, wherein that the HTTP request failed to be sent is determined based on no response received from the server.

A second feature, combinable with any of the previous or following features, wherein that the HTTP request failed to be sent is determined based on an abnormal response received from the server.

A third feature, combinable with any of the previous or following features, wherein the list of HTTP requests that failed to be sent is saved in a cache pool.

A fourth feature, combinable with any of the previous or following features, wherein recording information of HTTP requests that remain in the list if the list is not empty includes writing the information of HTTP requests that remain in the list to a window name of the second web page.

A fifth feature, combinable with any of the previous or following features, further comprising, if the list is not empty: recording information of HTTP requests that remain in the list; transferring the recorded information of HTTP requests that remain in the list to the second web page; and resending the HTTP requests that remain in the list based on the recorded information to the server.

A sixth feature, combinable with any of the previous or following features, if the list is empty: obtaining the information of the HTTP requests in the list from the first web page after being redirected to the second web page; and resending the HTTP requests based on the obtained information.

In a second implementation, a non-transitory, computer-readable medium storing one or more instructions executable by a computer system to perform operations comprising: monitoring one or more operations performed on a first web page; sending one or more HTTP requests that include the monitored one or more operations to a server; recording information associated with the one or more HTTP requests; upon determining that an HTTP request of the one or more HTTP requests has failed to be sent, recording the HTTP request to a list of HTTP requests that failed to be sent; deleting the HTTP request recorded to the list after receiving a normal response message from the server; and determining whether the list of HTTP requests that failed to be sent is empty when redirecting from the first web page to a second web page.

The foregoing and other described implementations can each, optionally, include one or more of the following features:

A first feature, combinable with any of the following features, wherein that the HTTP request failed to be sent is determined based on no response received from the server.

A second feature, combinable with any of the previous or following features, wherein that the HTTP request failed to be sent is determined based on an abnormal response received from the server.

A third feature, combinable with any of the previous or following features, wherein the list of HTTP requests that failed to be sent is saved in a cache pool.

A fourth feature, combinable with any of the previous or following features, wherein recording information of HTTP requests that remain in the list if the list is not empty includes writing the information of HTTP requests that remain in the list to a window name of the second web page.

A fifth feature, combinable with any of the previous or following features, further comprising, if the list is not empty: recording information of HTTP requests that remain in the list; transferring the recorded information of HTTP requests that remain in the list to the second web page; and resending the HTTP requests that remain in the list based on the recorded information to the server.

A sixth feature, combinable with any of the previous or following features, if the list is empty: obtaining the information of the HTTP requests in the list from the first web page after being redirected to the second web page; and resending the HTTP requests based on the obtained information.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: monitoring one or more operations performed on a first web page; sending one or more HTTP requests that include the monitored one or more operations to a server; recording information associated with the one or more HTTP requests; upon determining that an HTTP request of the one or more HTTP requests has failed to be sent, recording the HTTP request to a list of HTTP requests that failed to be sent; deleting the HTTP request recorded to the list after receiving a normal response message from the server; and determining whether the list of HTTP requests that failed to be sent is empty when redirecting from the first web page to a second web page.

The foregoing and other described implementations can each, optionally, include one or more of the following features:

A first feature, combinable with any of the following features, wherein that the HTTP request failed to be sent is determined based on no response received from the server.

A second feature, combinable with any of the previous or following features, wherein that the HTTP request failed to be sent is determined based on an abnormal response received from the server.

A third feature, combinable with any of the previous or following features, wherein the list of HTTP requests that failed to be sent is saved in a cache pool.

A fourth feature, combinable with any of the previous or following features, wherein recording information of HTTP requests that remain in the list if the list is not empty includes writing the information of HTTP requests that remain in the list to a window name of the second web page.

A fifth feature, combinable with any of the previous or following features, further comprising, if the list is not empty: recording information of HTTP requests that remain in the list; transferring the recorded information of HTTP requests that remain in the list to the second web page; and resending the HTTP requests that remain in the list based on the recorded information to the server.

A sixth feature, combinable with any of the previous or following features, if the list is empty: obtaining the information of the HTTP requests in the list from the first web page after being redirected to the second web page; and resending the HTTP requests based on the obtained information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
monitoring one or more operations performed on a first web page;
sending one or more hypertext transfer protocol (HTTP) requests that include the monitored one or more operations to a server;
recording information associated with the one or more HTTP requests;
upon determining that an HTTP request of the one or more HTTP requests has failed to be sent, recording the HTTP request to a list of HTTP requests that failed to be sent;
deleting the HTTP request recorded to the list after receiving a normal response message from the server; and
determining whether the list of HTTP requests that failed to be sent is empty when redirecting from the first web page to a second web page.

2. The computer-implemented method of claim 1, wherein that the HTTP request failed to be sent is determined based on no response received from the server.

3. The computer-implemented method of claim 1, wherein that the HTTP request failed to be sent is determined based on an abnormal response received from the server.

4. The computer-implemented method of claim 1, wherein the list of HTTP requests that failed to be sent is saved in a cache pool.

5. The computer-implemented method of claim 1, wherein recording information of HTTP requests that remain in the list if the list is not empty includes writing the information of HTTP requests that remain in the list to a window name of the second web page.

6. The computer implemented method of claim 1, further comprising, if the list is not empty:
recording information of HTTP requests that remain in the list;
transferring the recorded information of HTTP requests that remain in the list to the second web page; and
resending the HTTP requests that remain in the list based on the recorded information to the server.

7. The computer implemented method of claim 1, further comprising, if the list is empty:
obtaining the information of the HTTP requests in the list from the first web page after being redirected to the second web page; and
resending the HTTP requests based on the obtained information.

8. A non-transitory, computer-readable medium storing one or more instructions executable by a computer system to perform operations comprising:
monitoring one or more operations performed on a first web page;
sending one or more hypertext transfer protocol (HTTP) requests that include the monitored one or more operations to a server;
recording information associated with the one or more HTTP requests;
upon determining that an HTTP request of the one or more HTTP requests has failed to be sent, recording the HTTP request to a list of HTTP requests that failed to be sent;

deleting the HTTP request recorded to the list after receiving a normal response message from the server; and determining whether the list of HTTP requests that failed to be sent is empty when redirecting from the first web page to a second web page.

9. The non-transitory, computer-readable medium of claim 8, wherein that the HTTP request failed to be sent is determined based on no response received from the server.

10. The non-transitory, computer-readable medium of claim 8, wherein that the HTTP request failed to be sent is determined based on an abnormal response received from the server.

11. The non-transitory, computer-readable medium of claim 8, wherein the list of HTTP requests that failed to be sent is saved in a cache pool.

12. The non-transitory, computer-readable medium of claim 8, wherein recording information of HTTP requests that remain in the list if the list is not empty includes writing the information of HTTP requests that remain in the list to a window name of the second web page.

13. The non-transitory, computer-readable medium of claim 8, further comprising, if the list is not empty:
 recording information of HTTP requests that remain in the list;
 transferring the recorded information of HTTP requests that remain in the list to the second web page; and
 resending the HTTP requests that remain in the list based on the recorded information to the server.

14. The non-transitory, computer-readable medium of claim 8, further comprising, if the list is empty:
 obtaining the information of the HTTP requests in the list from the first web page after being redirected to the second web page; and
 resending the HTTP requests based on the obtained information.

15. A computer-implemented system, comprising:
 one or more computers; and
 one or more computer memory devices interoperably coupled with the one or more computers and having tangible, non-transitory, machine-readable media storing one or more instructions that, when executed by the one or more computers, perform operations comprising:
 monitoring one or more operations performed on a first web page;
 sending one or more hypertext transfer protocol (HTTP) requests that include the monitored one or more operations to a server;
 recording information associated with the one or more HTTP requests;
 upon determining that an HTTP request of the one or more HTTP requests has failed to be sent, recording the HTTP request to a list of HTTP requests that failed to be sent;
 deleting the HTTP request recorded to the list after receiving a normal response message from the server; and
 determining whether the list of HTTP requests that failed to be sent is empty when redirecting from the first web page to a second web page.

16. The computer-implemented system of claim 15, wherein that the HTTP request failed to be sent is determined based on no response received from the server.

17. The computer-implemented system of claim 15, wherein that the HTTP request failed to be sent is determined based on an abnormal response received from the server.

18. The computer-implemented system of claim 15, wherein the list of HTTP requests that failed to be sent is saved in a cache pool.

19. The computer-implemented system of claim 15, wherein recording information of HTTP requests that remain in the list if the list is not empty includes writing the information of HTTP requests that remain in the list to a window name of the second web page.

20. The computer-implemented system of claim 15, further comprising, if the list is not empty:
 recording information of HTTP requests that remain in the list;
 transferring the recorded information of HTTP requests that remain in the list to the second web page; and
 resending the HTTP requests that remain in the list based on the recorded information to the server.

* * * * *